Patented Nov. 22, 1949

2,489,147

UNITED STATES PATENT OFFICE 2,489,147

CHEWING GUM BASE

Boris N. Lougovoy, Jackson Heights, N. Y.

No Drawing. Application July 19, 1944,
Serial No. 545,729

4 Claims. (Cl. 99—135)

The object of the present invention is to provide a chewing gum base incorporating zein. Zein is a prolamine derivative of corn. It is odorless, nontoxic, tasteless and is dispersible in water, but insoluble in water and dilute acids. The problem which arises in the use of zein in such connection has several phases. While zein takes up water, water is readily evaporated and the zein becomes friable and wholly unsuited for the desired purpose. It is known that zein can be softened with glycerine, but this material being water-soluble will disperse in the saliva and will eventually be eliminated from the base, making it totally unsuitable for the desired purpose. Furthermore, zein is not compatible with natural gum, so that the attempts prescribed in the past for the use of prolamines in small quantities in conjunction with such elastic bodies as rubber or natural gums (Weber patent, 2,154,482 and Hatherell patent, 1,887,930) cannot commercially be applied with zein.

By means of the present invention, zein is compounded with a material which is hydrophilic, which is wholly compatible with the zein, and which acts in conjunction with the zein to fix a normal water content of the mixture, say about 3%, preventing the water from evaporation from the mixture. The mixture thus secured also is compatible with plasticizers of various types, such, for example, as dihydromethyl abietate, and tricresyl phosphate.

My preferred hydrophilic material is a glycol ester of maleic modified rosin ester, known as Hercules Power Company Resin X-2190-26. It is a soft resinous material and is adequately capable of taking up and holding water.

As an example, my base may be as follows:

| | Parts by wt. |
|---|---|
| Zein, powder | 7½ |
| Hercules Resin X-2190-26 | 15 |
| Dihydromethyl abietate, (Hercolyn) | 5 |

The resin and Hercolyn are melted together, and the powdered zein is then stirred into the mixture until a uniform soft paste is obtained. Keeping the mixture warm, water is gradually added until the zein fully swells, the mass being masticated. Water may be continually added until the mixture acquires a soft dough-like consistency. If desired, any excess water may be evaporated by heat, inasmuch as in practice, the retained water will ordinarily be from 3% upwards.

In forming chewing gum from the base, it may be mixed with an equal proportion of powdered sugar and with flavoring material, as for example, about ½% of oil of peppermint, then rolled and scored in the usual manner employed for the formation of slab chewing gum. The base also may be formed into nuggets and coated with sugar and flavoring materials by the use of usual rotary kettle procedure.

The zein content of my chewing gum base provides the elastomer required in such base and the required water content is maintained by the synthetic resin because of its hydrophilic characteristics. The base is such that base sets under room temperature into a firm and rigid structure required for a commercial slab or pellet of chewing gum. The structure, however, becomes soft and elastic at mouth temperature, and there is thus a narrow temperature range between the rigid solid state and the plastic condition.

It will be understood that various extenders, buffers, etc., may be added to my chewing gum base in accordance with the usual practice.

In some cases, the added plasticizer may not be required, inasmuch as the hydrophilic resin possesses of itself a plasticizing effect upon the zein. It will also be understood that the proportions may be varied in accordance with the particular effects desired in the base.

I claim:

1. A chewing gum base incorporating zein, water, glycol ester of maleic modified rosin ester, and a plasticizer.

2. A chewing gum base incorporating zein, water, a glycol ester of maleic modified rosin ester, and dihydromethyl abietate.

3. A chewing gum base comprising zein about 7.5 parts by weight, glycol ester of maleic modified resin ester about 15 parts by weight, a plasticizer about 5 parts by weight, and water not substantially less than 3% by weight.

4. A chewing gum base comprising zein about 7.5 parts by weight, glycol ester of maleic modified rosin ester about 15 parts by weight, dihydromethyl abietate about 5 parts by weight, and water not substantially less than 3% by weight.

BORIS N. LOUGOVOY.

REFERENCES CITED

The following references are of record in the file of this patent:

UNITED STATES PATENTS

| Number | Name | Date |
|---|---|---|
| 1,887,930 | Hatherell | Nov. 15, 1932 |
| 2,154,482 | Weber | Apr. 18, 1939 |
| 2,251,070 | Schantz | July 29, 1941 |
| 2,288,100 | Manson | June 30, 1942 |
| 2,284,804 | De Angelis | June 2, 1942 |